CHARACTER RECOGNIZER EMPLOYING DOMAIN WIRES

Filed March 28, 1966 Sheet 1 of 2

INVENTOR
J. L. SMITH

Herbert M. Shapiro
ATTORNEY 3,439,351
Patented Apr. 15, 1969

3,439,351

CHARACTER RECOGNIZER EMPLOYING DOMAIN WIRES

James L. Smith, Bedminster, N.J., assignor to Bell Telephone Laboratories, Incorporated, New York, N.Y., a corporation of New York Filed Mar. 28, 1966, Ser. No. 537,755
Int. Cl. G11b *5/68*
U.S. Cl. 340—174 7 Claims This invention relates to information processing devices and, more particularly, to devices for recognizing characteristic information.

Devices for recognizing characteristic information, often termed "word recognizers," are in widespread use in all types of communication and data processing systems. For example, in communication systems where a plurality of receivers are potentially capable of receiving a communication, each receiver includes, advantageously, a word recognizer for detecting a characteristic word designating the receiver to which the communication is addressed. In the absence of the characteristic word (address) designating a receiver, that receiver is disabled from receiving the communication. This transmission medium is competitive with switching (tree) logic systems, primarily, to the extent that inexpensive word recognizers become available. Moreover, tree logic systems are impractical in certain instances such as in remote radio telephone receiver systems.

An object of this invention is to provide a new and novel word recognizer.

The foregoing and further objects of this invention are realized in one embodiment thereof wherein a magnetic domain wall device is turned to account. A domain wall device comprises a magnetic medium, typically a wire, in which a reverse magnetized domain is provided in response to a first field in excess of a nucleation threshold and through which reverse domains are propagated in response to a second field in excess of a propagation threshold but less than the nucleation threshold. Usually, the first field is applied, during a write operation, over a limited portion of the wire and the resulting reverse domain is advanced by a succession of second fields applied over consecutive limited portions of the wire, in a well known manner. The reverse domain is bounded by what are termed domain walls. A single domain wall may be advanced also.

Specifically, in accordance with this invention, a word recognizer comprises first and second domain wall wires. The wires are coupled by a three-phase propagation means which provides a succession of second fields for advancing a single domain wall thus expanding a reverse domain in each wire. The propagation means comprises three conductors coupled to each wire. The conductors have like-sensed, interleaved coils and are activated in sequence to provide the required step-along pattern of second fields. Two of the conductors may be shared by the two wires. A separate third conductor, however, is necessary for each of the first and second wires. The third conductors are connected to a common drive source which provides a pulse on one or the other thereof in response to an input binary one or zero, respectively. In this manner, effective second fields are generated in complementary first and second positions in the first and second domain wall wires in response to a coded sequence of binary one and binary zero inputs. In addition, magnets are removably positioned at complementary second and first positions along the first and second magnetic wires. Each input provides a pulse on a third conductor and initiates a pulse sequence on the first and second conductors. The resulting pulse sequence generates appropriate consecutive second (advance) fields in one of the domain wall wires. The pulses on the first and second conductors and, in addition, the magnets provide appropriate second fields in the other wire. Reverse domains, one nucleated in each wire, are expanded to reach corresponding output positions concurrently only if the proper binary character is applied.

A feature of this invention is a word recognizer comprising first and second domain wall wires with means providing fields at complementary coded positions therealong during the entire operation thereof.

Another feature of this invention is a word recognizer comprising first and second domain wall wires including permanent magnets removably placed at different coded positions therealong.

The foregoing and further objects and features of this invention will be understood more fully from the following detailed discussion rendered in conjunction with the accompanying drawing wherein.

Figure 1:
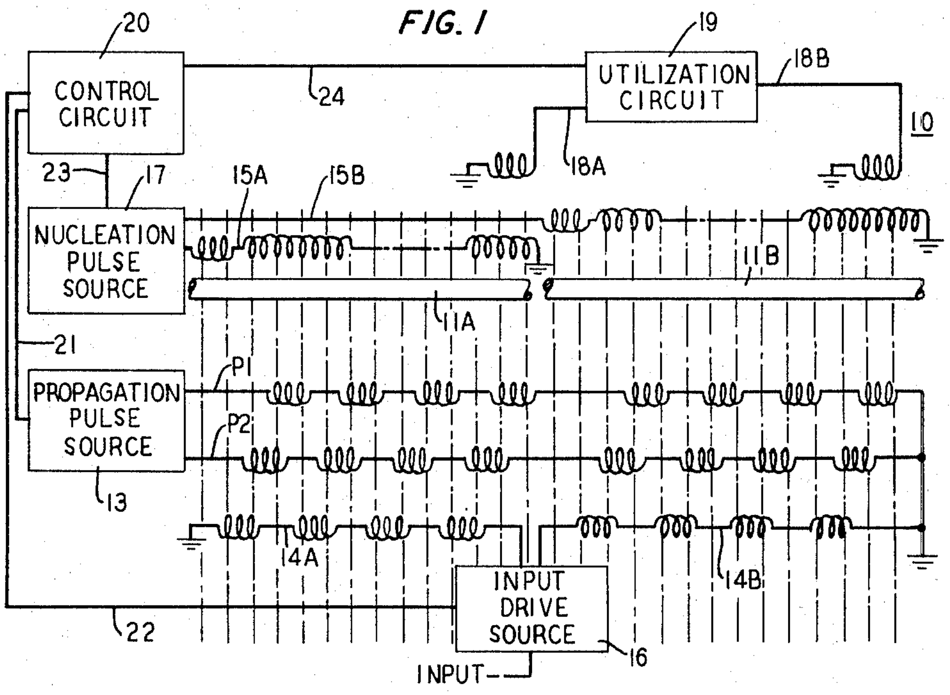
FIG. 1 is a schematic representation of a word recognizer in accordance with this invention.

Specifically, FIG. 1 depicts a word recognizer 10 in accordance with this invention. The recognizer comprises, illustratively, first and second magnetic wires 11A and 11B of the type described. First and second propagation conductors P1 and P2 couple wires 11A and 11B serially at spaced apart positions therealong. The couplings between the propagation conductors and wires 11A and 11B are represented in FIG. 1 by a series of coils shown below the representation of the magnetic wires there. The coils are shown illustratively of like sense and interleaved. Conductors P1 and P2 are connected between a propagation pulse source 13 and ground.

Each coil of conductor P1 is spaced apart from the next succeeding coil of conductor P2 defining therebetween a set of positions along each of wires 11A and 11B. A conductor 14A is coupled, in a first sense, to those positions so defined along wire 11A. Similarly, a conductor 14B is coupled, in a second sense, to those positions so defined along wire 11B. Each of conductors 14A and 14B is connected between an input drive source 16 and ground.

Nucleation conductors 15A and 15B couple input positions of wires 11A and 11B respectively in one sense and the remainder of each of the corresponding wires in the opposite sense. The input positions are undesignated in FIG. 1 but can be seen to correspond to the position next adjacent that of the coupling between conductors 14A and wire 11A and that of the coupling between conductors 14B and wire 11B furthermost to the left as viewed in the figure. Conductors 15A and 15B are connected between a nucleation pulse source 17 and ground.

Output conductors 18A and 18B couple output positions along wires 11A and 11B, respectively. The output positions are defined by the position of the fourth and eighth (from the left) couplings between conductor P1 and wires 11A and 11B, respectively, as viewed in FIG. 1. Conductors 18A and 18B are connected between a utilization circuit 19 and ground.

Sources 13, 16 and 17, and utilization circuit 19 are connected to a control circuit 20 by means of conductors 21, 22, 23 and 24, respectively. The various sources and circuits described herein may be any such elements capable of operating in accordance with this invention.

Figure 2:
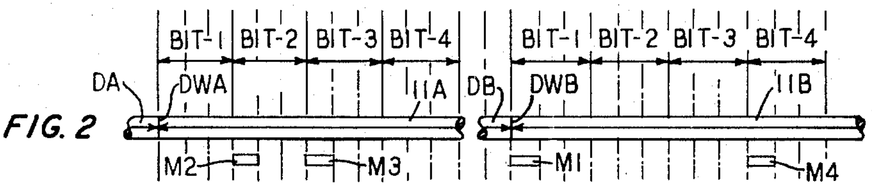
FIGS. 2 and 3 are schematic illustrations of a portion of the recognizer of FIG. 1 showing magnetic flux patterns therein during operation.

In operation of the circuit of FIG. 1, a reverse magnetized domain is provided at the input position of each of wires 11A and 11B. Such reverse domains are represented in FIG. 2 by arrows directed to the right in wires 11A and 11B. The wires are assumed initialized to a magnetic condition represented by arrows directed to the left in FIG. 2. Domain walls DWA and DWB are defined by the interface between the initialized region of each of wires 11A and 11B and the corresponding reverse magnetized domain.

The domain walls are advanced to the corresponding output positions by propagation fields generated in response to pulses applied to conductors P1 and P2. The advance of the domain walls also depends on the fields generated by pulses applied to conductors 14A and 14B. These last mentioned conductors, however, are pulsed, respectively, in response to positive (binary one) and negative (binary zero) inputs (at I) to the input drive source 16. Thus, a sequence of binary one input signals would appear necessary to advance domain wall DWA to one output position while a sequence of binary zero input signals would appear necessary to advance the domain wall DWB to the other output position. But most input codes comprise both ones and zeros interleaved and the advance of those walls to pass corresponding output positions concurrently appears unattainable. Yet, in accordance with this invention, the domain walls DWA and DWB arrive at coresponding output positions concurrently in response to the proper input code. In order to insure such concurrent arrival of the domain walls in accordance with this invention, permanent magnets are positioned in coded positions along each of wires 11A and 11B thus determining the input code (binary ones and zeros) to which the particular word recognizer responds.

The permanent magnets are represented in FIG. 2 by rectangular blocks designated M1, M2, M3, and M4 and are positioned to correspond to particular bit positions. Illustratively, a bit position is defined by three adjacent couplings beginning with a coupling between conductor 14A and wire 11A or between conductor 14B and wire 11B. Thus, illustratively, each of wires 11A and 11B is divided into four bit positions as indicated in FIG. 2. Permanent magnets M2 and M3 are positioned adjacent the couplings between conductor 14A and wire 11A corresponding to the second and third bit positions along that wire. Permanent magnets M1 and M4 similarly are positioned adjacent the couplings between conductor 14B and wire 11B corresponding to the first and fourth bit positions there. The magnets are conveniently premounted on a (connectionless) plug-in board (not shown) which is mated to the wires 11A and 11B. The simplicity of the coding scheme is clear when it is realized that wires 11A and 11B may comprise a single domain wall wire. In such a case particularly, conductors 15A and 15B may comprise a single conductor coupled to the two input positions in one sense and to the remaining portion(s) of the wire (or wires) in a second sense. Operation is entirely analogous.

The permanent magnets are assumed to provide fields in corresponding portions of wires 11A and 11B in a direction of the magnetization of the reverse domain so to advance the corresponding domain wall without nucleating additional reverse domains. It will now be shown that permanent magnets at the described positions code the word recognizer of FIG. 1 for the input word 1001. That is to say, an output is provided for detection by utilization circuit 19 only when the input code 1001 is received. Thereafter the operation of the circuit of FIG. 1 for an improper input code 1100 will be discussed.

The magnets M1 and M4 and magnets M1 and M2 are considered to comprise first and second complementary magnet sets, respectively, providing corresponding first and second sets of fields in the first and second domain wall wires. The first set corresponds to binary ones in the input code; the second set corresponds to binary zeros. It will become apparent that the particular input code provides, for all practical purposes, second and first complementary sets of effective fields in the second and first domain wall wires such that the latter fields, the fields provided by the magnets and the additional second (advance) fields, provided concurrently in the wires, comprise appropriate fields to advance both domains to corresponding output positions concurrently.

In accordance with the illustrative operation, then, a binary one is received, from a remote sender (not shown), at the input I of input drive source 16. We may assume, illustratively, that the input signals comprise positive and negative pulses corresponding to binary ones and zeros respectively. Conveniently, drive source 16 includes means, under the control of control circuit 20, responsive to those pulses for activating nucleation source 17, for pulsing conductors 14A or 14B and for activating propagation source 13. In practice, input signals are frequently preceded by a framing pulse to which control circuit 20 may respond directly by activating nucleation source 17. The activation of nucleation source 17 provides reverse domains in the input position of each of wires 11A and 11B. The activation of propagation source 13 provides a pulse on each of conductors P2 and P1, consecutively, thus generating, along with a preceding pulse on conductor 14A or 14B, the requisite advance fields.

Figure 3:
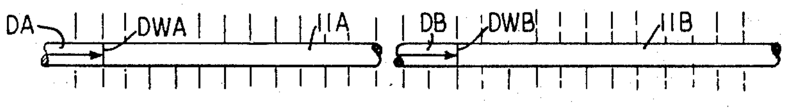

In response to the first positive input pulse, corresponding to a binary one ("1"), nucleation pulse source 17 pulses conductors 15A and 15B for nucleating a reverse domain at the input position of each of wires 11A and 11B under the control of control circuit 20. Those reverse domains are designated as DA and DB in FIG. 2. The domains DA and DB expand under the influence of the fields generated by the "1" pulse in conductor 14A and by the magnet M1 respectively. The expanded domains are shown in FIG. 3. A comparison between FIGS. 2 and 3 shows that the expansion of the domains is tantamount to moving the domain walls DWA and DWB to the right as viewed.

Figure 4:
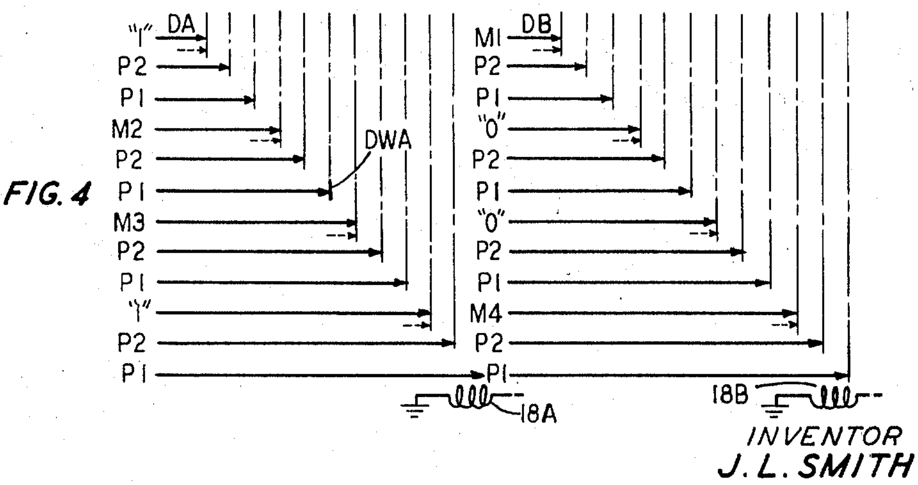
FIGS. 4 and 6 are charts showing flux patterns in the portion of the recognizer shown in FIGS. 2 and 3 during operation.

FIG. 4 is a chart of the advance of the domain walls DWA and DWB during operation. The arrows shown in FIG. 4 may be understood as representing reverse domains in wires 11A and 11B of FIG. 3. The field causing the advance of the domain wall is indicated to the left of each arrow and is represented by the broken arrow beneath each representation of the reverse domain. Initially then, the reverse domains DA and DB are provided at the input positions of wires 11A and 11B respectively and expanded by the field of the positive "1" input and by the M1 magnet respectively as shown in FIG. 3. The first line of FIG. 4 also depicts the condition as shown in FIG. 3.

A pulse on conductor P2 generates a field which further expands the domains as shown in line 2 of of FIG. 4. A following pulse on conductor P1 similarly expands the domains as shown in line 3 of FIG. 4. The advance pulses P2 and P1 are provided sequentially by means of propagation pulse source 13 under the control of control circuit 20, in response to each input. Those propagation pulses follow the pulse on conductors 14A or 14B. The magnet M2 now expands domain DA. The next (negative) input pulse (a zero) expands domain DB. It is to be understood that if one domain is expanded so that its domain wall advances to a position to be influenced by a magnet, that wall advances further immediately. The other domain is expanded in response to the next appropriate input pulse. Thus, for example, domain DA is expanded by magnet M2 before domain DB is expanded in response to the zero input pulse. The input pulse, however, is provided before the next advance pulse is applied. Consequently, the advance of both domains DA and DB due to the magnet M2 and the zero input pulse, respectively, may be shown on the same line in FIG. 4 without a loss in accuracy as long as we remember that the expansion depicted along a line in FIG. 4 does not necessarily indicate simultaneity.

The next advance pulse P2 expands both domains simultaneously as shown in the fifth line of FIG. 4. The following P1 pulse does the same as shown in the sixth line. The domain wall DWA is now in a position to be advanced by the magnet M3. The next input pulse is negative (binary zero) and expands domain DB. The resulting state is indicated in line 7 of FIG. 4.

The following P2 and P1 pulses expand domains DA and DB until domain walls DWA and DWB are positioned such that a pulse on conductor 14A advances the former wall to the right and the magnet M4 advances the latter wall to the right. The latter advances immediately; the former advances on the next positive input pulse (binary one). The next succeeding advance pulses P2 and P1 advance the walls past the positions in wires 11A and 11B coupled by output conductors 18A and 18B, respectively, as indicated just below line 12 (the bottom line) in FIG. 4. Consequently, like voltages are generated concurrently in conductors 18A and 18B for detection by utilization circuit 19 under the control of control circuit 20.

Figure 5:
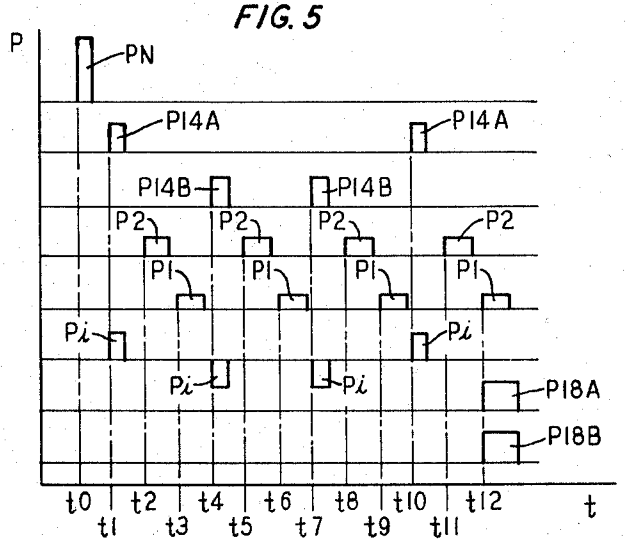
FIG. 5 is a pulse diagram of the operation of the recognizer of FIG. 1.

The foregoing operation is summarized in the pulse diagram of FIG. 5. A nucleation pulse PN is assumed provided in conductors 15A and 15B at a time *t*0 in FIG. 5. The corresponding magnetic condition of wires 11A and 11B is shown in FIG. 2. A first input pulse P*i* (positive) is received at a time *t*1 in FIG. 5 causing a pulse P14A on conductor 14A. The corresponding magnetic condition is shown in FIG. 3 and in the first line of FIG. 4. Advance pulses, conveniently designated P2 and P1 to correspond to the propagation conductors, are shown at times *t*2 and *t*3 of FIG. 5. Those pulses expand domains DA and DB to the positions shown in line 3 of FIG. 4. A negative input pulse P*i* is shown at time *t*4 in FIG. 5 causing a pulse P14B on conductor 14B. Next succeeding advance pulses P2 and P1 occur at times *t*5 and *t*6 in FIG. 5. The resulting magnetic condition is shown in the sixth line of FIG. 4.

A next input pulse P*i* (negative) is shown at time *t*7 in FIG. 5 causing a pulse P14B on conductor 14B. The next succeeding advance pulses P2 and P1 are shown at times *t*8 and *t*9 in FIG. 5 and expand domains DA and DB to the positions shown in line 9 of FIG. 4.

The last input pulse P*i* of the assumed correct code is a positive (binary one) input shown at time *t*10 in FIG. 5. That input pulse causes a pulse P14A on conductor 14A. The corresponding magnetic condition is shown in line 10 of FIG. 4. The next succeeding advance pulses P2 and P1 are shown at times *t*11 and *t*12 in FIG. 5. Output pulses P18A and P18B are induced also at time *t*12 as shown in FIG. 5, the domains DA and DB being expanded by those advance pulses to positions coupled by the conductors 18A and 18B, respectively.

Figure 6:
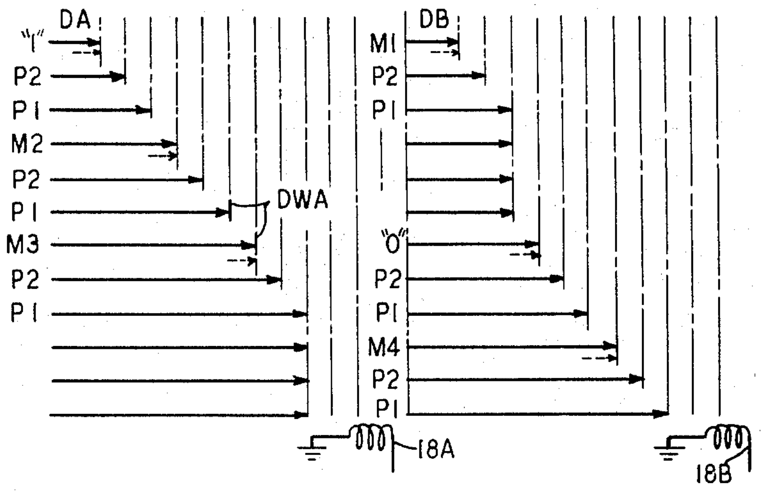

The progress of an incorrect code 1100 is illustrated in the chart of FIG. 6. A reverse domain is again nucleated in the initial position as shown in FIG. 2 and expanded exactly as described in connection with the first three lines of FIG. 4 in response to a binary one input (positive) and the magnet M1 and then in response to the first two advance pulses P2 and P1. At this point, however, the expansion of the domain DB is interrupted. The domain wall DWB is at a position where only a pulse on conductor 14B provides a suitably located (effective) advance field. Such a pulse is provided in response to a binary zero (negative) input. A binary one (positive) input is next, however, in accordance with the assumed incorrect code. Therefore, domain wall DWB remains unmoved and domain DB is not expanded. The magnet M2 expands domain DA, however, and the resulting configuration is depicted in line 4 of FIG. 6. The indication of only effective field generating means is shown in FIG. 6 to the left of the arrows representing reverse domains there.

The next advance pulses P2 and P1 expand only domain DA because domain wall DWB is not in a position to be influenced by the fields generated by those pulses. Lines 5 and 6 of FIG. 6 depict the expansion of domain DA and the stationary position of domain DB in response to the advance pulses.

Domain wall DWA is now in a position to be expanded by the field of magnet M3, and domain DA, accordingly, is expanded further as shown in line 7 of FIG. 6. A binary zero (negative) input appears next in accordance with the assumed incorrect input code. Consequently, conductor 14B is pulsed, as before, and domain DB is expanded. The resulting configuration is depicted also by line 7 of FIG. 6.

The next advance pulses P2 and P1 expand both domains DA and DB as shown in lines 8 and 9 of FIG. 6.

The next input, however, is negative (binary zero). Thus conductor 14B is pulsed, as before. Domain DB, however, is already expanded by magnet M4 to a position to be influenced by next applied advance pulses P2 and P1. The advance of domain DB in response to fields generated by magnet M4 and those P2 and P1 pulses is shown in lines 10, 11 and 12 of FIG. 6. It is seen that domain DA is not expanded in response to those pulses.

Neither domain DA nor DB is expanded to a point where the domain wall DWA or the domain wall DWB has reached conductor 18A or 18B, respectively. Thus no pulses are provided in those conductors for detection by utilization circuit 19. A different incorrect input code, of course, may expand either domain DA or domain DB, alternatively, to the corresponding output position. No incorrect code, however, expands those domains to reach the output positions concurrently.

From the foregoing description of the operation of the circuit of FIG. 1, it is clear that a nucleation pulse is required to establish the reverse domains DA and DB. The nucleation conductor for so establishing the domains when pulsed also drives the remainder of wires 11A and 11B to initialized conditions. Thus, if a domain is not expanded to the output positions during operation in response to a given input code, it will not be expanded to the output position, by mistake, during a later operation. That the domains DA and DB are expanded to a position short of the positions coupled by output conductors 18A and 18B is clear from the bottom line of FIG. 6 and the positions of those output conductors as depicted there.

What has been described is considered only illustrative of this invention. Accordingly, numerous other arrangements according to the principles of this invention may be devised by one skilled in the art without departing from the spirit and scope thereof.

What is claimed is:

1. A combination comprising first and second magnetic media comprising a material in which a reverse magnetized domain including a domain wall is established in response to a first field in excess of a nucleation threshold and through which domain walls are advanced in response to second fields in excess of a propagation threshold and less than said nucleation threshold, nucleation means for establishing a reverse domain in an input position of each of said media, output means coupled to each of said media at output positions therealong spaced apart from corresponding said input positions for detecting the concurrent arrival of domain walls there, first means for providing said second fields in first and second complementary coded positions in said first and second media respectively, and second means responsive to first and second input pulses for providing said second fields at said second and first coded positions in said first and second media respectively.

2. A combination in accordance with claim 1 including third means responsive to said first and second inputs for providing additional second fields in said first and second media for advancing domain walls between said input and output positions there.

3. A combination in accordance with claim 2 wherein said first and second media comprise first and second magnetic wires.

4. A combination in accordance with claim 3 wherein said first means comprises permanent magnets.

5. A combination in accordance with claim 4 wherein said first and second magnetic wires comprise different portions of a single magnetic wire.

6. In combination, first and second elongated magnetic wires of a material in which a reverse magnetized domain including a domain wall is established in response to a first field in excess of a nucleation threshold and through which domain walls are advanced in response to second fields in excess of a propagation threshold and less than said nucleation threshold, means for establishing a reverse domain in a first position of each of said wires, output means coupled to each of said wires at second positions therealong spaced apart from corresponding said first positions for detecting the concurrent arrival of domain walls there, means responsive to a coded sequence of first and second input pulses for advancing said domain walls concurrently to said second positions, said last mentioned means comprising first, second, third, and fourth conductors each including a set of spaced apart couplings, said couplings of said first, second, and third conductors being interleaved along said first wire for providing step-along said second fields when pulsed in sequence, said first, second, and fourth conductors including couplings which interleave along said second wire for similarly providing step-along second fields therein, means responsive to each of said first or second input pulses for pulsing said first and second conductors in sequence, means for pulsing said third and fourth conductors in response to said first and second inputs respectively for providing coded effective second fields in said first and second wires, and means for providing said second fields at positions along said first and second wires coded to complement the effective second fields provided in response to said input code.

7. A character recognizer comprising first and second domain wall wires, means coupled to said wires for nucleating a reverse magnetized domain including a domain wall at a first position in each wire, propagation means coupled to said first and second wires for advancing said domain walls, said propagation means including first and second conductors each including sets of coils coupled to corresponding spaced apart positions along said first and second wires respectively, said first and second conductors being responsive to first and second input signals respectively for providing effective fields for advancing the corresponding said domain wall at first and second complementary coded positions respectively, magnetic elements removably positioned at said second and first complementary coded positions along said first and second conductors respectively for providing fields for advancing the corresponding domain wall there, and output means coupled to said first and second wires at output positions therein for providing an output responsive to the concurrent passage of said domain walls thereby.

References Cited

UNITED STATES PATENTS

| | | | |
|---|---|---|---|
| 3,241,126 | 3/1966 | Snyder | 340—174 |
| 3,287,711 | 11/1966 | Broadbent | 340—174 |

BERNARD KONICK, *Primary Examiner.*

G. M. HOFFMAN, *Assistant Examiner.*